United States Patent [19]

Jeong

[11] Patent Number: 5,804,942
[45] Date of Patent: Sep. 8, 1998

[54] POSITION DETERMINING APPARATUS AND CONTROL METHOD OF ROBOT

[75] Inventor: Joon-Young Jeong, Seoul, Rep. of Korea

[73] Assignee: Samsung Electronics Co., Ltd., Suwon, Rep. of Korea

[21] Appl. No.: 684,791

[22] Filed: Jul. 22, 1996

[30] Foreign Application Priority Data

Aug. 8, 1995 [KR] Rep. of Korea .................. 1995-24442

[51] Int. Cl.⁶ .................................................. B64C 13/18
[52] U.S. Cl. .......................... 318/580; 318/587; 364/460; 701/26
[58] Field of Search ................................... 318/580–587; 364/423.098, 423.099, 424.027–424.033, 460, 461; 701/23–28

[56] References Cited

U.S. PATENT DOCUMENTS

| | | | |
|---|---|---|---|
| 4,920,520 | 4/1990 | Gobel et al. ................................ | 367/99 |
| 5,006,988 | 4/1991 | Borenstein et al. .............. | 364/424.029 |
| 5,293,955 | 3/1994 | Lee .......................................... | 180/169 |
| 5,307,271 | 4/1994 | Everett, Jr. et al. .............. | 364/424.028 |
| 5,400,244 | 3/1995 | Watanabe et al. ................ | 364/424.033 |
| 5,402,051 | 3/1995 | Fujiwara et al. ......................... | 318/587 |
| 5,456,332 | 10/1995 | Borenstein ................................ | 180/167 |
| 5,534,762 | 7/1996 | Kim ..................................... | 318/568.12 |
| 5,545,960 | 8/1996 | Ishikawa .................................. | 318/587 |
| 5,568,030 | 10/1996 | Nishikawa et al. ...................... | 318/587 |
| 5,576,947 | 11/1996 | Wienkop ............................. | 364/167.01 |

*Primary Examiner*—Brian Sircus
*Attorney, Agent, or Firm*—Burns, Doane, Swecker & Mathis, L.L.P.

[57] ABSTRACT

A self-propelled steerable robot emits ultrasonic waves in forward, rightward and leftward directions. On the basis of detecting those waves after being reflected from the walls, a controller on the robot determines an angle of travel of the robot relative to a wall of a room, enabling the robot to be turned and oriented parallel to opposite walls of the room. By then emitting waves toward those opposite walls and detecting the waves reflected therefrom, respective distances of the robot to those opposite walls can be determined. By turning the robot toward the longer of the two distances, and repeating the above steps, the robot can eventually become disposed at a center of the room. Then the robot advances from the center until reaching one of four known points in the room where the respective distances between both opposite walls changes. This enables the controller to determine where in the room the robot is located. The robot then travels along a predetermined path from that point.

4 Claims, 5 Drawing Sheets ure and contral method of a robot.

POSITION DETERMINING APPARATUS AND CONTROL METHOD OF ROBOT

FIELD OF THE INVENTION

The present invention relates to a self-moving robot capable of cleaning a floor and of monitoring a trespasser, and more particularly to a position determining apparatus and contral method of a robot.

BACKGROUND OF THE INVENTION

As a conventional robot, there is, of course, the well known self-moving robot.

The conventional robot moves to target positions under a control of a microcomputer. The microcomputer controls movement of the robot on the basis of ultrasonic wave or infra-red signals emitting from ultrasonic generating means or infra-red signal generating means.

The microcomputer discriminates a present position of the robot on the basis of the ultrasonic wave signal or the infra-red signal, and carries out its operation, for example, cleaning or monitoring.

As is apparent from the above description, the conventional robot uses a signal generating system such as a ultrasonic wave signal generating means.

Accordingly, the robot system has a complicated construction.

Further, if a driving wheel of the robot slips on the working area due to a slippery condition of the floor, the robot may not correctly reach the signal from the signal generating system.

Therefore, the signal receiving system may not receive signals emitting from the signal generating system.

Therefore, the robot must alternately move in left and right directions to receive the signal receiving system signal emitted from the signal generating system thereby causing a delay in determining the present position of the robot.

SUMMARY OF THE INVENTION

The present invention has been made in view of the above-described problem occuring in the prior art and an object of the invention is to provide a position discriminating apparatus and control method of the robot which is capable of correctly moving to a target position based on a present position which is correctly discriminated during an initial operation.

In accordance with the present invention, the above object can be accomplished by providing a position determining apparatus of a robot comprising: control means for controlling an overall operation of a robot; driving control means for controlling movement the robot under the control of the control means; travel distance detecting means for detecting a travel distance of the robot; turning angle detecting means for detecting a turning angle when the robot is turned in left or right; obstacle detecting means for detecting a presence of an obstacle on a travel range and for detecting a distance to walls.

Further, the above object can be accomplished by providing a control method of robot comprising steps of: calculating an angle between a front wall and the robot in response to a distance to the front wall from the robot, setting up the robot parallel to the front wall by turning in the angle;

moving the robot to a central point on a travel range by turning the robot in response to distances to left and right walls from the robot;

searching a special point changing distances to the left and right walls during movement of the robot to the walls from the central point;

determining a present position and a present direction of the robot on the basis of distances to the left and right walls from the robot, coordinates and direction of the robot according to the special point;

and performing a predetermined operation of the robot in response to the present position and the present direction of the robot.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENT

Figure 1:
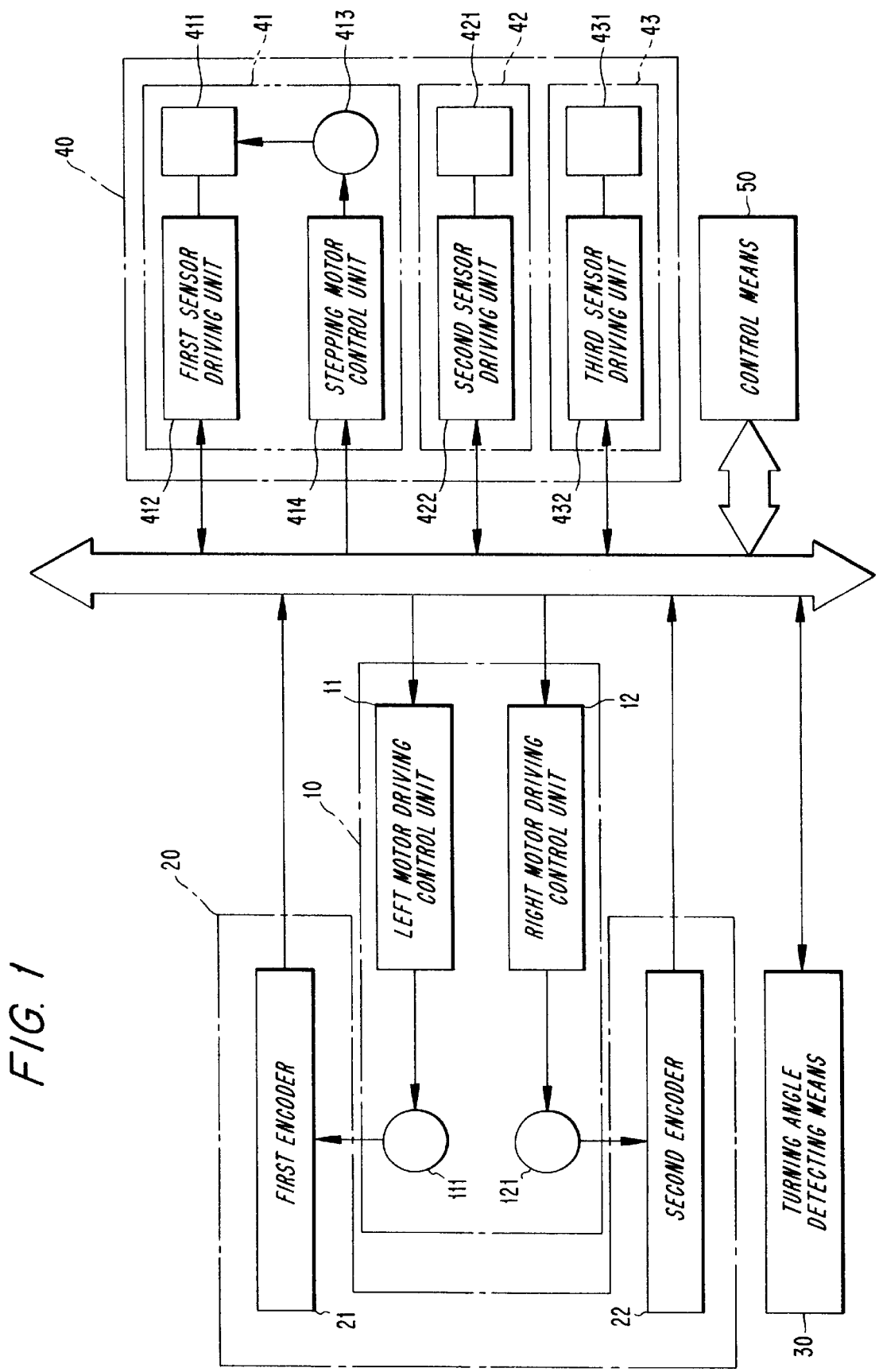
FIG. 1 is a block diagram of a position discriminating apparatus of a robot according to an embodiment of the present invention.

FIG. 1 shows a block diagram of a position discriminating apparatus of a robot according to an embodiment of the present invention.

As shown in the drawing, driving control means 10 controls movement of the robot to thereby move the robot in forward, backward, left and right directions.

The driving control means 10 comprises a left motor driving control unit 11 for driving a left motor 111 to thereby move the robot in the right direction, and a right motor driving control unit 12 for driving a right motor 121 to thereby move the robot in the left direction.

The left motor 111 and the right motor 121 are provided with driving wheels, respectively.

Travel distance detecting means 20 detects a travel distance of the robot 1 resulting from a driving of the driving wheels.

The travel distance detecting means 20 comprises a first encoder 21 for generating a pulse signal in proportion to a number of rotations of the left motor 111 to thereby detect the travel distance of the robot in the right direction, and a second encoder 22 for generating a pulse signal in proportion to a number of rotations of the right motor 121 to thereby detect a travel distance of the robot in the left direction.

Turning angle detecting means 30 detects whether the robot 1 changes its travel direction while moving to a target position.

The turning angle detecting means 30 is a sensor for sensing a direction angle, for example, a gyro sensor.

That is, the change of the direction angle depends on the change of voltage a level.

Accordingly, it is possible to detect the change of the travel direction of the robot 1 based on a turning angular velocity according to the voltage level.

Obstacle detecting means 40 detects a presence of an obstacle and a distance to the obstacle on a travel path, and distances to front, left and right walls of from the robot 1.

The obstacle detecting means 40 comprises a first obstacle detecting unit 41 for detecting the presence of an obstacle in front of the robot 1, and the distance to the front wall WF, a second obstacle detecting unit 42 for detecting the presence of an obstacle to the left of the robot 1, and the distance to the left wall WL, and a third obstacle detecting unit 43 for detecting the presence of an obstacle to the right of the robot 1, and the distance to the right wall WR.

The first obstacle detecting unit 41 includes: (i) a first ultrasonic wave sensor 411 for emitting an ultrasonic wave in a forward direction from the robot 1, and for receiving a signal reflected from the front wall WF or the obstacle in order to detect the presence of the obstacle in the front of a forward robot 1 or distance to the front wall WF, (ii) a first sensor driving unit 412 for inputting 50 Hz of square wave to the first ultrasonic wave sensor 411 in order to emit the ultrasonic wave from the same, (iii) a stepping motor 413 for turning the first ultrasonic wave sensor 411 at a predetermined angle of about 180 degrees, and (iv) a stepping motor control unit 414 for controlling the driving of the stepping motor 413.

The second obstacle detecting unit 42 includes: (i) a second ultrasonic wave sensor 421 for emitting an ultrasonic wave in a leftward direction from the robot 1, and for receiving a signal reflected from the left wall WL or an obstacle in order to detect the presence of the obstacle to the left of the robot 1 or the distance to the left wall WL, and (ii) a second sensor driving unit 422 for inputting 50 Hz of square wave to the second ultrasonic wave sensor 421 to thereby emit the ultrasonic wave.

The third obstacle detecting unit 43 includes a third ultrasonic wave sensor 431 for emitting an ultrasonic wave in a rightward direction from the robot 1, and for receiving a signal reflected from the right wall WR or an obstacle in order to detect the presence of the obstacle to the right of the robot 1 or the distance to the right wall WR, and iii a third sensor driving unit 432 for inputting 50 Hz of square wave to the third ultrasonic wave sensor 431 to thereby emit the ultrasonic wave.

Furthermore, in the drawing, control means 50 determines a present position of the robot 1 on the basis of the travel distance input from the travel distance detecting means 20 and the travel direction input from the turning angle detecting means 30.

Further, the control means 50 determines distances to the front, left and right walls WF, WL, and WR from the robot 1, and determines an angle between the robot 1 and the walls on the basis of data corresponding to the walls and the obstacle, which is detected by the obstacle detecting means 40.

Accordingly, the control means 50 controls the movement of the robot 1 according to the present position of the robot 1, the distances to the walls from the robot 1, and the angle between the robot 1 and the walls so that the robot 1 can correctly move to the target position without deviating from a normal travel path.

The control means 50 is a central processing unit.

A procedure for operating the robot of the invention will now be described.

Figure 2:
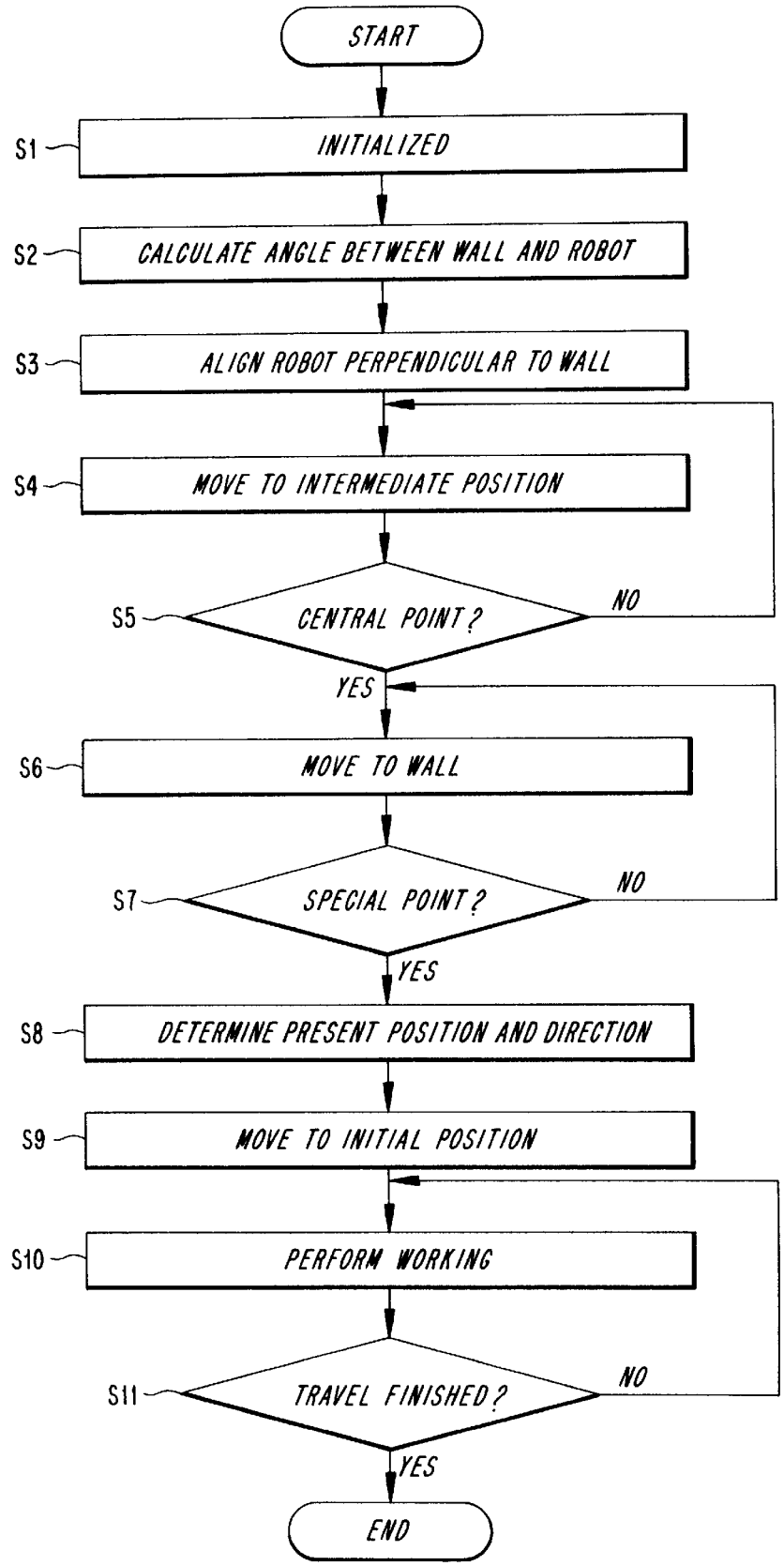
FIG. 2 is a flowchart exhibiting the procedure for the control operation of the robot of the invention.

FIG. 2 shows a flowchart exhibiting the procedure for the control operation of the robot of the invention.

At step s1, the robot 1 operates in response to the pushing of an operation switch disposed at a predetermined position thereon.

At this time, operation of the robot 1 is initiated directly by means of the control means 50.

Figure 3:
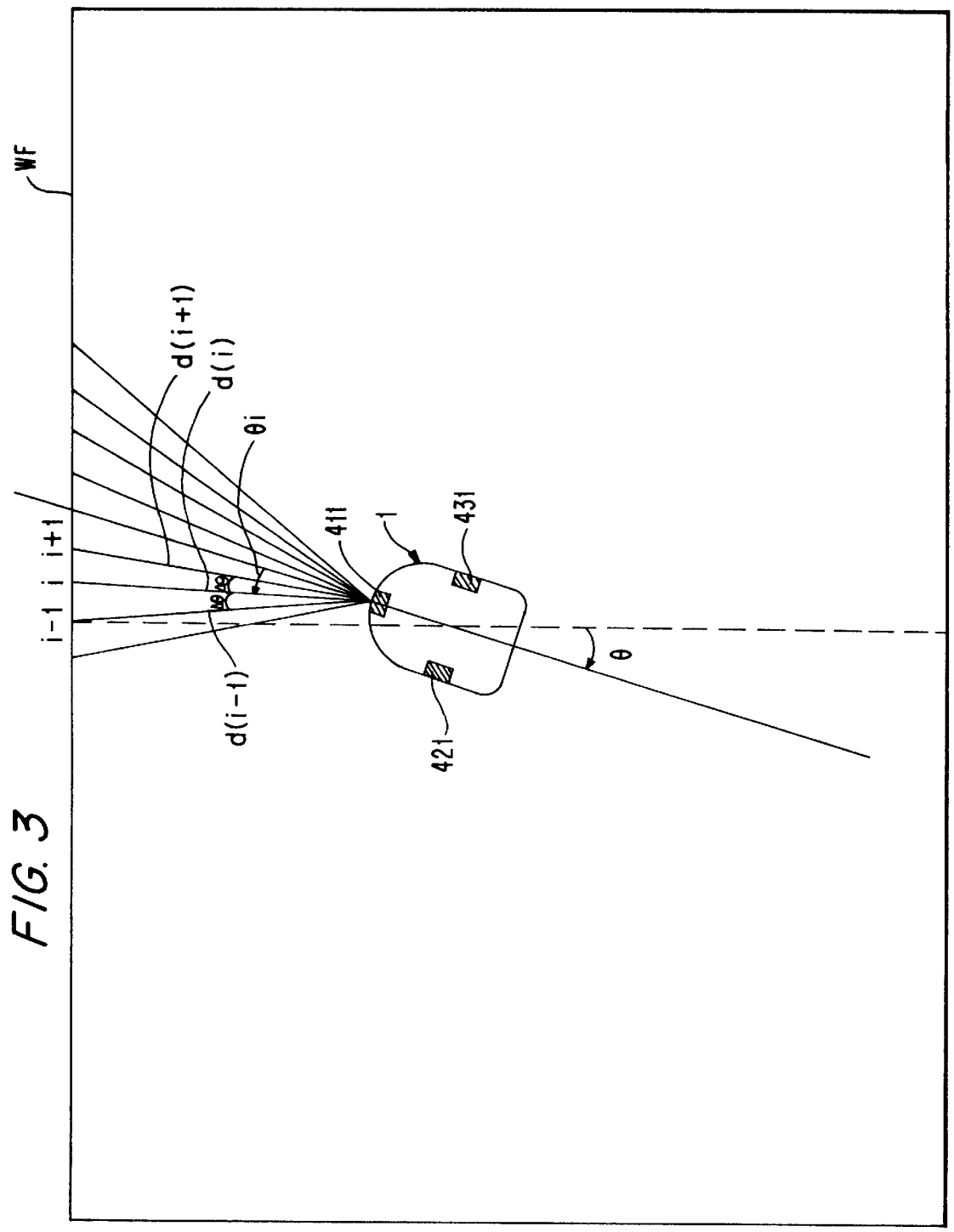
FIG. 3 is a explaining view of method of calculating the angle between the robot and the front wall surface thereof.

At step s2, the first ultrasonic wave sensor 411 emits the ultrasonic wave toward the front wall WF of the robot 1 as shown in FIG. 3.

That is, the first ultrasonic wave sensor 411 emits the ultrasonic wave toward the front while turning in a range of about 180 degrees by a driving of the stepping motor 413.

The first ultrasonic wave sensor 411 receives the reflected signal from the front wall WF, and outputs it to the control means 50.

Therefore, the control means 50 determines the distance to the front wall WF from the robot 1, and the angle between the robot 1 and the front wall WF.

FIG. 3 shows how the angle between the robot and the front wall WF is determined.

Assuming that a direction i is a perpendicular direction to the front wall WF when a distance to the wall WF is measured while turning the first ultrasonic wave sensor 411 in a predetermined angle, the distances d(i−1), d(i) and d(i+1) corresponding to wall locations i−1, i, i+1, respectively, are as follows.

If $\cos\Delta\theta \cdot d(i-1) = \cos\Delta\theta \cdot d(i+1) = d(i)$, then $\cos^{-1}\{d(i)/d(i-1)\} = \cos^{-1}\{d(i)/d(i+1)\} = \Delta\theta$.

If d(i−1) is equal to d(i), or d(i+1) is equal to d(i), then it can be assumed that the direction representing the shortest distance is most closely satisfied by the perpendicular direction i of all directions satisfying the formulae $0 < \cos^{-1}\{d(i)/d(i-1)\} < \Delta\theta$, $0 < \cos^{-1}\{d(i)/d(i+1)\} < \Delta\theta$.

In other words, if the direction i is perpendicular to the wall WF, it can be regarded that the angle θi between the direction i and the front side of the robot 1 is the almost same to the angle θ between the robot 1 and the front wall WF.

Subsequently, the driving control means 10 receives a control signal output from the control means 50 to drive the right motor 121 thereby causing the robot 1 to be aligned perpendicular to the wall WF by turning the robot 1 in the left direction by the angle θi at step S3.

Figure 4:
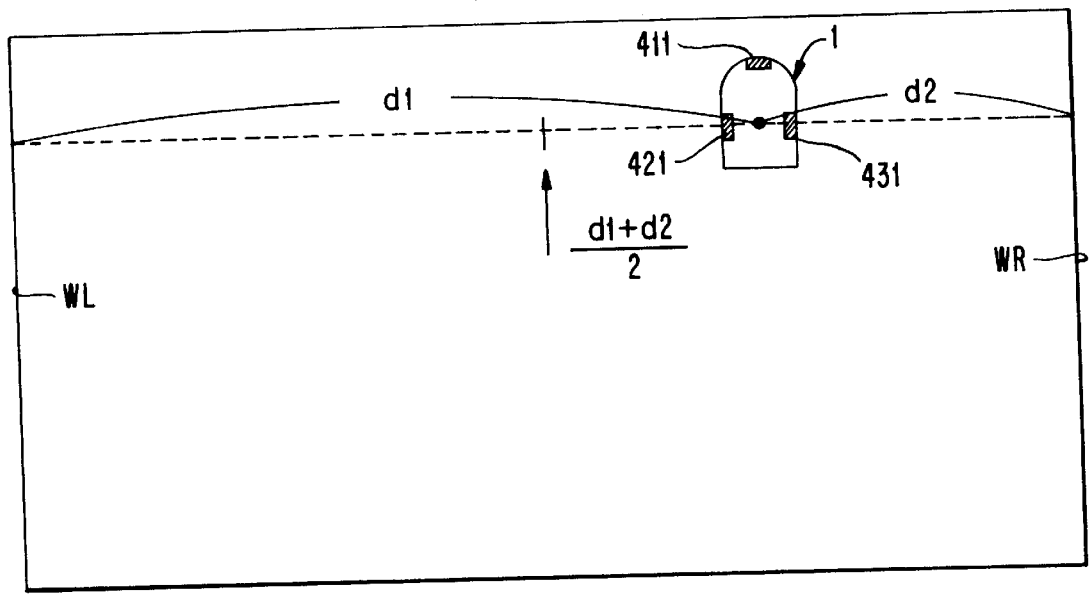
FIG. 4 is a explaining view of method of moving the robot to the intermediate position between the left wall surface and the right wall surface.

At step S4, the second ultrasonic wave sensor 421 emits the ultrasonic wave toward the left wall WL of the robot 1 and receives the reflected signal from the left wall WL and outputs it to the control means 50 to calculate the distance d1 to the wall WL from the left side of the robot 1 as shown in FIG. 4.

Furthermore, the third ultrasonic wave sensor 431 emits the ultrasonic wave toward the right wall WR and receives the reflected signal from the right wall WR, and outputs it to the control means 50 to calculate the distance d2 to the wall WR from the right side of the robot 1.

When the distance d1 is larger than the distance d2 (d1>d2) the driving control means 10 receives a control signal output from the control means to thereby drive the right motor 121.

Therefore, the robot 1 turns to the left side by 90° and thereafter moves to the intermediate position (d1+d2)/2, between the left wall WL and the right wall WR.

Figure 5:
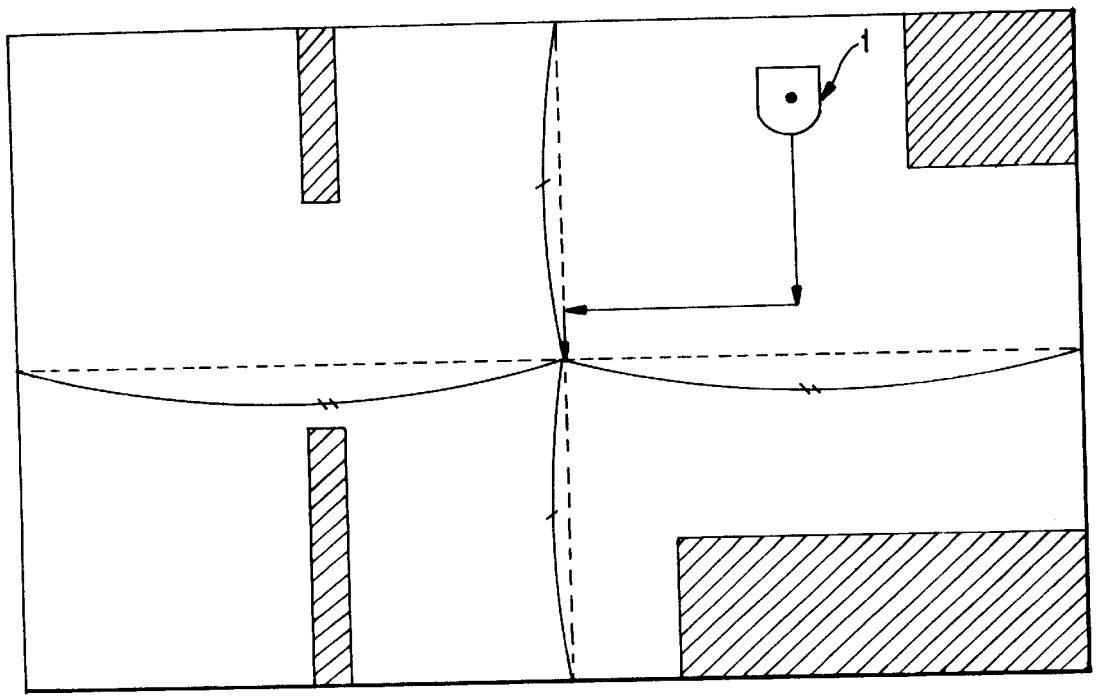
FIG. 5 is a explaining view of method of moving the robot to the central position of the room.

The above-described operations are repeated until the robot reaches the center of the room (travel range) (See FIG. 5).

It is possible to move the robot 1 to the central point in a travel range although the travel range has a complicated structure.

The control means 50 determines whether the robot 1 is placed at the central point of the room at step S5.

That is, if the present position of the robot 1 is not in the central point of the room, that is, the answer is NO, the procedure returns to step S4 to repeat the operation of step S4 until the robot 1 reaches to the central point.

On the other hand, if at step S5, the robot 1 is placed at the central point of the room, that is, the answer is YES, the present direction of the robot 1 must now be determined.

Therefore, the control means 50 outputs a control signal to the driving control means 10 to drive the left motor 111 and the right motor 121 so that the robot 1 moves toward a wall from the central point at step S6.

Therefore, the control means 50 can now determine a direction of the robot 1.

At step S7, since the robot moves and searches for a special point from among a plurality of special points a, b, c, d (see FIG. 6) previously stored in a memory of the control means 50 which are points in the room encountered by the robot where the distances to the left and right walls from the robot 1 change.

If the control means determines that the robot 1 is not at a special point at present, that is, the answer is NO, the procedure returns to the step S6 to repeat the operation of the step S6.

Therefore, the robot 1 continuously moves toward the wall.

On the other hand, if as a result of step S7, the answer is YES, the procedure proceeds to step S8.

Figure 6:
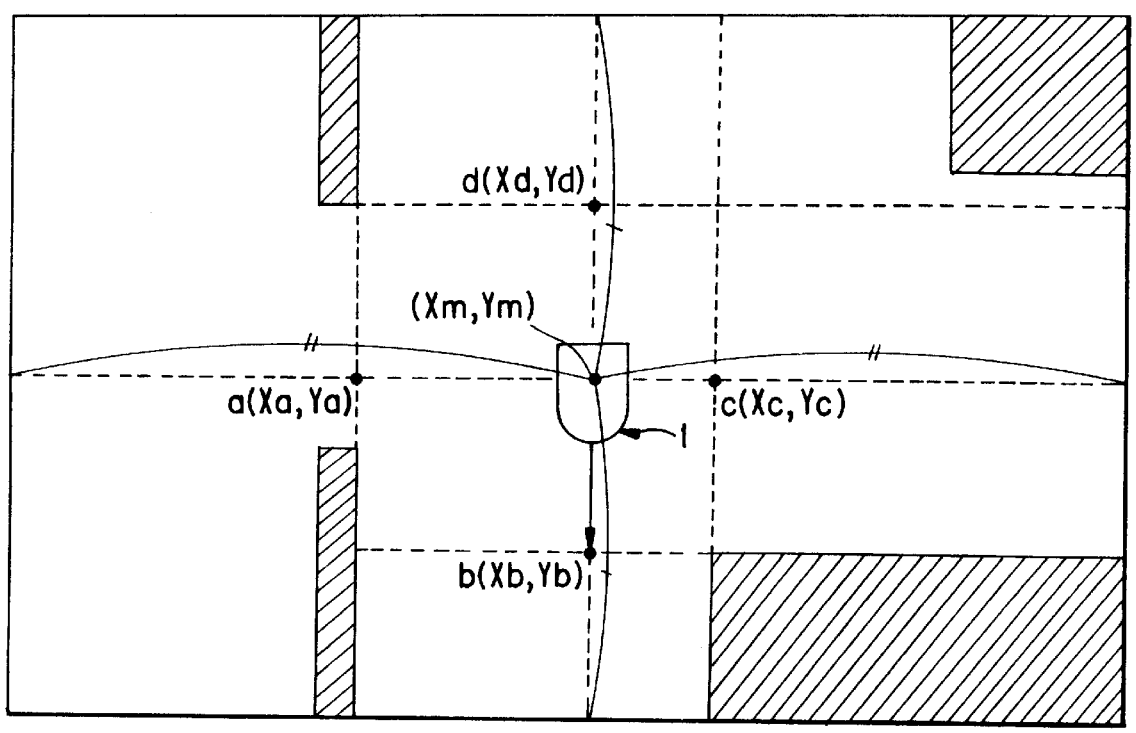
FIG. 6 is a explaining view of method of moving the robot to the special point.

At the step S8, as shown in FIG. 6, the control means 50 determines the present position and direction of the robot 1 on the basis of the distance to the left and right walls from the robot 1 and information for the four special points a,b,c and d, for example coordinates Xb, Yb, previously stored in the memory when the robot 1 reaches the special point b.

Subsequently, the robot 1 continuously moves toward a start point for performing the cleaning operation or the monitoring operation along a travel path previously stored in the memory at step S9.

At step S10, the robot 1 carries out the predetermined operation.

At step S11, the control means 50 determines whether the robot 1 finishes its operation for performing the cleaning or the monitoring.

As a result, the answer is NO, the procedure returns to the step S10 to repeat the operation of the step S10.

On the other hand, as a result of determining the step S11, the answer is YES, the control means 50 outputs a control signal to the driving control means 10 to stop the movement of the robot 1.

Having described specific preferred embodiment of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method of controlling a self-propelled, steerable robot having a control mechanism, comprising the steps of:

A) calculating an angle formed by the robot with a wall of a room to determine an extent by which the robot must be turned to become oriented parallel to two opposite walls of the room;

B) turning the robot by that extent to orient the robot parallel to the two opposite walls of the room;

C) determining two respective distances from the robot to the two opposite walls;

D) turning the robot in the direction of the larger of the two distances;

E) repeating steps C and D until the robot reaches a center point of the room;

F) advancing the robot from the center point parallel to two opposite walls of the room until reaching a predetermined point in the room where the respective distances from the robot to those two opposite walls change;

G) determining a present position of the robot in the room on the basis of the changed distances; and then H) advancing the robot along a predetermined path of travel from such present position.

2. The method according to claim 1 wherein step A includes swinging an ultrasonic wave emitter on the robot through a range of travel while emitting ultrasonic waves and sensing those waves once reflected from a wall toward which the robot faces, to determine a shortest distance to the wall, and calculating the angle on the basis of that shortest distance.

3. The method according to claim 1 wherein step C comprises emitting ultrasonic waves toward the two opposite walls and sensing the ultrasonic waves reflected from those two walls.

4. A self-propelled, steerable robot adapted to reach a center point in a room, comprising:

a controller;

obstacle detecting means for detecting an obstacle in front of the robot and for detecting respective distances from the robot to a pair of opposite walls of a room, the obstacle detecting means connected to the controller for transmitting signals therebetween;

turning means for turning the robot to the right or left, and connected to the controller for transmitting signals therebetween;

turning angle detecting means for detecting an angle of turning when the robot turns to the right or left sufficiently to face the one of the pair of walls located farthest from the robot, the turning angle detecting means being connected to the controller for transmitting signals therebetween; and propelling means for propelling the robot toward the one wall;

the controller including travel distance detecting means connected to the propelling means for detecting a travel distance of the robot and determining when the robot travels to a point midway between the pair of walls.

* * * * *